US012671712B2

(12) United States Patent
McDonald et al.

(10) Patent No.: US 12,671,712 B2
(45) Date of Patent: *Jun. 30, 2026

(54) REAL TIME APPLICATION PROTECTION SYSTEM CONFIGURATION DRIFT CATEGORIZATION AND RESPONSE

(71) Applicant: Wells Fargo Bank, N.A., San Francisco, CA (US)

(72) Inventors: Matthew Thomas McDonald, Callahan, FL (US); Jeremy W. Long, Herndon, VA (US); Mitch Moon, Plymouth, MN (US); Isaiah Adonu, Oro Valley, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 18/528,346

(22) Filed: Dec. 4, 2023

(65) Prior Publication Data

US 2024/0106853 A1 Mar. 28, 2024

Related U.S. Application Data

(63) Continuation of application No. 17/122,635, filed on Dec. 15, 2020, now Pat. No. 11,876,822.

(Continued)

(51) Int. Cl.
*H04L 9/40* (2022.01)
*G06F 21/57* (2013.01)
(Continued)

(52) U.S. Cl.
CPC ........ *H04L 63/1433* (2013.01); *G06F 21/577* (2013.01); *G06N 20/00* (2019.01);
(Continued)

(58) Field of Classification Search
CPC ............. H04L 63/1433; H04L 41/0816; H04L 41/0853; H04L 63/1416; H04L 63/1466; H04L 63/20
See application file for complete search history.

(56) References Cited

U.S. PATENT DOCUMENTS 7,797,540 B2    9/2010   Conley et al.
8,843,915 B2    9/2014   Liverance
(Continued)

OTHER PUBLICATIONS

Prosecution History from U.S. Appl. No. 17/122,635, now issued U.S. Pat. No. 11,876,822, dated Dec. 21, 2022 through Oct. 24, 2023, 86 pp.

(Continued)

*Primary Examiner* — Oleg Korsak
(74) *Attorney, Agent, or Firm* — Shumaker & Sieffert, P.A.

(57) ABSTRACT

Techniques are described for improving real-time application protection (RTAP) systems (e.g., web application firewalls (WAFs), runtime application self-protection (RASP) systems). In particular, a device within a trusted network may monitor or test the configuration settings of the RTAP systems, network traffic into the RTAP systems, and/or log information from the RTAP systems. For example, the device may detect drift in a configuration for a particular RTAP system by comparing the configuration settings of the RTAP systems to baseline configuration settings and classifying any detected drift as good drift or bad drift. In some examples, the device may maintain the configuration settings or set the configuration settings as the baseline configuration settings when the configurations settings include good drift from the baseline configuration settings. In other examples, the device may set the configuration settings with the bad drift to the baseline configuration settings.

20 Claims, 3 Drawing Sheets

Related U.S. Application Data

(60) Provisional application No. 62/972,280, filed on Feb. 10, 2020.

(51) Int. Cl.

| | |
|---|---|
| *G06N 20/00* | (2019.01) |
| *H04L 41/0816* | (2022.01) |
| *H04L 41/0853* | (2022.01) |

(52) U.S. Cl.
CPC ...... *H04L 41/0816* (2013.01); *H04L 41/0853* (2013.01); *H04L 63/1416* (2013.01); *H04L 63/1441* (2013.01); *H04L 63/1466* (2013.01); *H04L 63/20* (2013.01); *G06F 2221/033* (2013.01)

(56) References Cited

U.S. PATENT DOCUMENTS

| | | |
|---|---|---|
| 10,114,954 B1 | 10/2018 | Bellis et al. |
| 10,326,672 B2 | 6/2019 | Scheib et al. |
| 10,341,377 B1 | 7/2019 | Dell'Amico et al. |
| 10,558,809 B1 | 2/2020 | Joyce et al. |
| 10,630,468 B1 | 4/2020 | Wang et al. |
| 10,650,150 B1 | 5/2020 | Rajasooriya et al. |
| 11,115,272 B1 | 9/2021 | Kumar et al. |
| 11,503,075 B1 | 11/2022 | Sirianni et al. |
| 11,558,415 B1 | 1/2023 | McDonald et al. |
| 11,876,822 B1 | 1/2024 | McDonald et al. |
| 2003/0176931 A1 | 9/2003 | Pednault et al. |
| 2005/0039047 A1 | 2/2005 | Raikar et al. |
| 2005/0177746 A1 | 8/2005 | Bunn et al. |
| 2006/0253906 A1 | 11/2006 | Rubin et al. |
| 2009/0293126 A1 | 11/2009 | Archer et al. |
| 2010/0057478 A1 | 3/2010 | Hamilton, II et al. |
| 2011/0321164 A1 | 12/2011 | Saxena et al. |
| 2012/0278892 A1 | 11/2012 | Turbin |
| 2015/0213272 A1 | 7/2015 | Shezaf et al. |
| 2015/0271193 A1 | 9/2015 | Estes et al. |
| 2017/0034023 A1* | 2/2017 | Nickolov ........... H04L 43/0817 |
| 2017/0061133 A1 | 3/2017 | Trabelsi |
| 2017/0318034 A1 | 11/2017 | Holland |
| 2018/0124098 A1 | 5/2018 | Carver et al. |
| 2018/0218171 A1 | 8/2018 | Bellala et al. |
| 2018/0278649 A1 | 9/2018 | Thomas et al. |
| 2019/0114435 A1 | 4/2019 | Bhalla et al. |
| 2019/0205542 A1 | 7/2019 | Kao et al. |
| 2019/0260804 A1 | 8/2019 | Beck et al. |
| 2020/0092319 A1 | 3/2020 | Spisak et al. |
| 2020/0145455 A1 | 5/2020 | Nandi |
| 2020/0210590 A1 | 7/2020 | Doyle et al. |
| 2020/0257539 A1 | 8/2020 | Borlick et al. |
| 2020/0344248 A1 | 10/2020 | De Jesus |
| 2020/0401702 A1 | 12/2020 | Karabatis et al. |
| 2021/0099476 A1* | 4/2021 | Montgomery ...... H04L 63/1425 |
| 2021/0155136 A1 | 5/2021 | Kim et al. |
| 2021/0182403 A1 | 6/2021 | Shacklton et al. |
| 2021/0182404 A1 | 6/2021 | Shacklton et al. |
| 2021/0200840 A1 | 7/2021 | Kannan et al. |

OTHER PUBLICATIONS

U.S. Appl. No. 17/122,734, filed Dec. 15, 2020, naming inventors McDonald et al.
U.S. Appl. No. 17/122,765, filed Dec. 15, 2020, naming inventors McDonald et al.

* cited by examiner

REAL TIME APPLICATION PROTECTION SYSTEM CONFIGURATION DRIFT CATEGORIZATION AND RESPONSE

This application is a continuation of U.S. patent application Ser. No. 17/122,635, filed 15 Dec. 2020, which claims the benefit of U.S. Provisional Application No. 62/972,280, filed 10 Feb. 2020, the entire content of each application is incorporated herein by reference.

TECHNICAL FIELD

This disclosure relates to computer systems and, in particular, application security for computer systems.

BACKGROUND

Web applications are client-server computer programs in which client-side operations and user interface(s) run on a web browser. The server-side operations of web applications may be implemented by a computer network including a number of servers and computing devices. For example, a web application running on a server, accessed via a web browser, may communicate, via the Internet, with a database server of a computer network to access files or other information. In some instances, one or more real-time application protection systems may be deployed to monitor network data and identify data that may be malicious based on one or more configurations. For example, a web application firewall (WAF) system may filter, monitor, and block malicious data to and from a web application based on one or more configurations of the WAF. Similarly, a runtime application self-protection (RASP) system detects and reports or blocks malicious data based on one or more configurations of the RASP and runtime information of the web application. WAF or RASP systems may be commercial off-the-shelf systems that can be interacted with via one or more application programming interfaces (APIs). Configurations for one or more real-time application protection systems may be changed over time from the baseline configurations, which may leave the web applications vulnerable to potential network attacks.

SUMMARY

In general, this disclosure describes computer systems for improving real-time application protection (RTAP) systems (e.g., web application firewalls (WAFs), runtime application self-protection (RASP) systems, and the like). RTAP systems may be commercial off-the-shelf systems that can be interacted with via one or more application programming interfaces (APIs).

In one example, a device within a trusted network may monitor or test the configuration settings of the RTAP systems, network traffic into the RTAP systems, and/or log information from the RTAP systems. For example, the device may detect drift in a configuration for a particular RTAP system by comparing the configuration settings of the RTAP systems to baseline configuration settings and classifying any detected drift as good drift or bad drift. Good drift may be classified as configuration changes that provide equal or greater protection than the baseline configuration settings and bad drift may be classified as configuration changes that provide less protection than the baseline configuration settings. In some examples, the device may maintain the drifted configuration settings of the RTAP system when the configuration settings include good drift from the baseline configuration settings. In some cases, the device may further use the configuration settings having good drift as a new baseline configuration. In this way, the device may not override stronger protections in the configuration settings with good drift. In other examples, the device may reset the configuration settings of the RTAP system back to the baseline configuration when the drifted configuration settings include bad drift. In this way, the device may help ensure that the baseline level of protections from a particular RTAP system are not overwritten.

In another example, this disclosure is directed to a computer-implemented method including detecting a difference between first configuration settings of an application protection system corresponding to a first application and baseline configuration settings of the application protection system, wherein the baseline configuration settings includes protections against a first plurality of attacks; in response to detecting the difference, determining whether the difference comprises good drift or bad drift, wherein the difference comprises bad drift if the first configuration settings do not include protections against one or more attacks of the first plurality of attacks, and wherein the difference comprises good drift if the first configuration settings include protections against at least the first plurality of attacks; and in accordance with a determination that the difference comprises good drift, maintaining the first configuration settings for the application protection system.

In another example, this disclosure is directed a computer-readable medium storing instructions that, when executed by a computing system, cause one or more processors of the computing system to: detect a second difference between second configuration settings of a second application protection system and second baseline configuration settings of the second application protection system; in response to detect the second difference, determine whether the second difference comprises good drift or bad drift, wherein the second difference comprises bad drift if the second configuration settings do not include protections against one or more attacks of the first plurality of attacks, and wherein the second difference comprises good drift if the second configuration settings include protections against at least the first plurality of attacks; and in accordance with a determination that the second difference comprises bad drift, set the second application protection system to have the second baseline configuration settings.

The details of one or more examples are set forth in the accompanying drawings and the description below. Other features, objects, and advantages will be apparent from the description and drawings, and from the claims.

DETAILED DESCRIPTION

Figure 1:
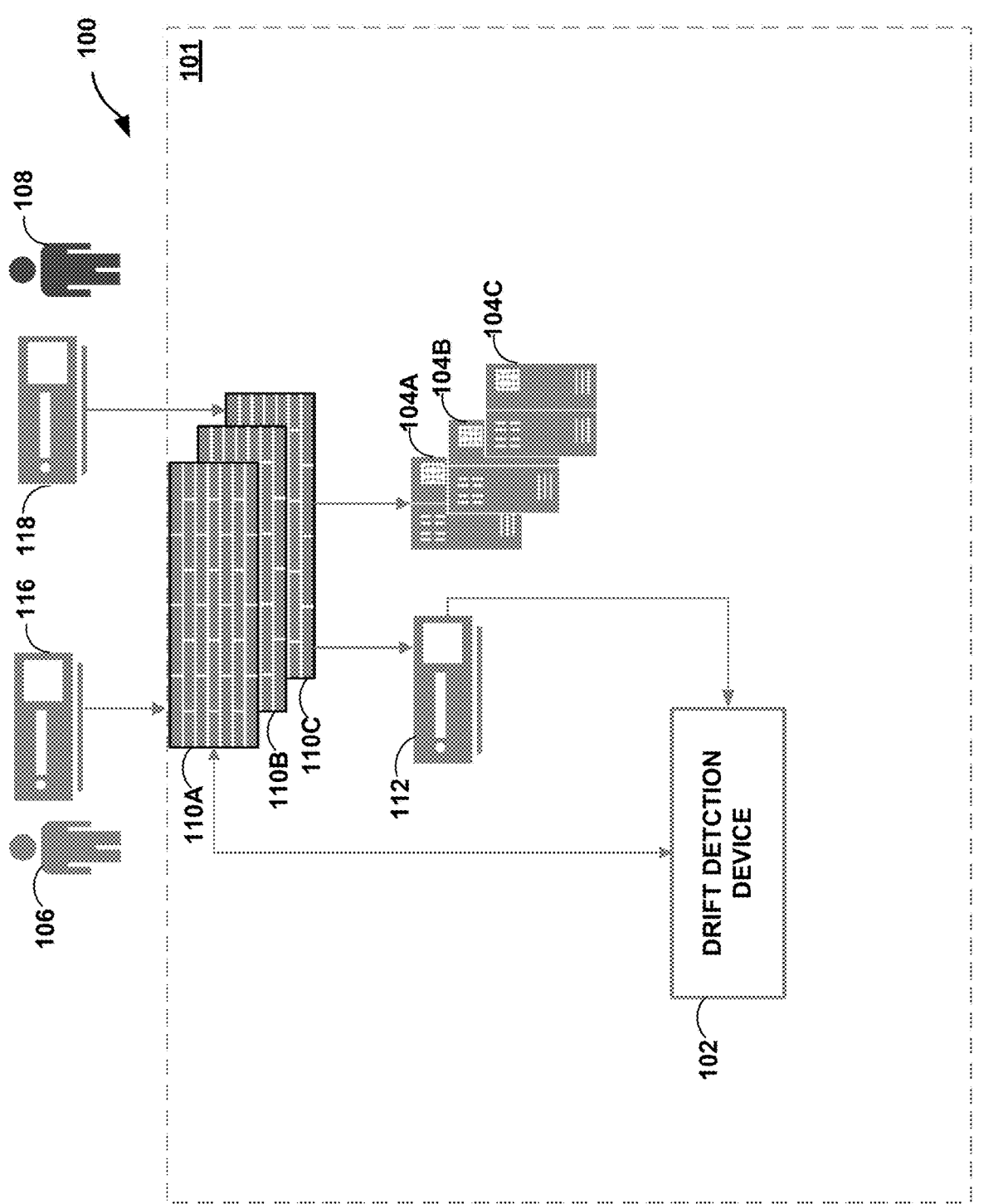
FIG. 1 is a block diagram illustrating an example computing system configured to monitor configurations of real-time application protection systems according to the techniques of this disclosure.

FIG. 1 is a block diagram illustrating an example computing system 100 configured to monitor configurations of real-time application protection (RTAP) systems 110A-110C (collectively, "RTAP systems 110") according to the techniques of this disclosure. RTAP systems 110 may include web application firewalls (WAFs), runtime application self-protection (RASP) systems, and the like). RTAP systems 110 may be commercial off-the-shelf systems that can by interacted with via one or more application programming interfaces (APIs). For example, RTAP systems 110 may be configured or deployed through one or more APIs. Additionally, information from RTAP systems 110 may be obtained through one or more APIs. In some examples, RTAP systems 110 may include deployed agents that may interacted with through a centralized server using an API.

In particular, system 100 includes a trusted network 101 that hosts web applications 104A-104C (collectively, "applications 104"). Trusted network 101 may be a computer network (e.g., a wide area network (WAN), such as the Internet, a local area network (LAN), or a virtual private network (VPN)), a telephone network (e.g., the PSTN or a wireless network), or another wired or wireless communication network. Although illustrated as a single entity, trusted network 101 may comprise a combination of multiple networks. Trusted network 101 also includes RTAP systems 110 that monitor network data in and out of applications 104 to identify data that may be malicious based on one or more configurations of RTAP systems 110. In some examples, RTAP system 110A may correspond (e.g., monitor) application 104A, RTAP system 110B may correspond application 104B, and RTAP system 110C may correspond application 104C. For example, a computing device 116 operated by a user 106 may interact with application 104A (e.g., submit and obtain data from the application) while RTAP system 110A monitors the data traffic between computing device 116 and application 104A. While three RTAP systems 110 and three applications 104 are shown in FIG. 1, system 100 may contain fewer or more RTAP systems 110 or applications 104. In another example, a computing device 118 operated by a malicious user 108 may attempt to submit malicious data or obtain data for which they are not authorized from application 104C (e.g., a denial of service attack, malicious HTTP POST/GET request, port scanning, a brute force attack) and RTAP system 110C may identify this malicious network traffic and block, report, and/or log it.

In some examples, computing device 116 and/or computing device 118 may be any suitable communication or computing device, such as a conventional or a mobile, non-mobile, wearable, and/or non-wearable computing device capable of communicating over network 18. For example, each of computing device 116, 118 may include any one or a combination of a conventional mobile phone, a smart phone, a smart watch, a tablet computer, a personal digital or virtual assistant, a gaming system, a media player, a smart television, an Internet of Things (IoT) device, an automobile or other vehicle, a laptop or notebook computer, a desktop computer, or any other type of wearable, non-wearable, mobile, and non-mobile computing device that may perform operations in accordance with one or more aspects of the present disclosure. One or more of computing device 116, 118 may support communication services over packet-switched networks, e.g., the public Internet, including Voice over Internet Protocol (VOIP).

In some examples, system 100 may include data monitoring device 112 that is configured to monitor, analyze, and/or search data or logs from RTAP systems 110 and/or applications 104. For example, data monitoring device 112 may execute data monitoring or other security information and event management (STEM) software that may capture, index, and correlate real-time data.

System 100 may also include a drift detection device 102 configured to monitor configurations of RTAP systems 110 to detect drift from baseline configuration settings. In general, drift detection device 102 may comprise one or more computing devices, including servers, laptop or notebook computers, desktop computers, or any other type of computing devices that may perform operations in accordance with one or more aspects of the present disclosure.

In some examples, drift detection device 102 may obtain information about one or more baseline configurations for each of RTAP systems 110 by requesting the configurations via application programming interfaces (APIs) for one or more remote devices (e.g., databases, servers, cloud) (not shown). In some examples, drift detection device 102 may store the configuration information in local memory. For example, one or more remote devices or drift detection device 102 may store first baseline configuration settings for RTAP system 110A, second baseline configuration settings for RTAP system 110B, and third baseline configuration settings for RTAP system 110C. In some examples, first, second, and third baseline configuration settings may be the same or different. Baseline configuration settings may be configuration settings that have been tested and/or approved for deployment for RTAP systems 110 that include protections against a plurality of known potential attacks. In some examples, drift detection device 102 may store baseline configurations in local memory or in remote memory (e.g., on a server, database, or another device). Drift detection device 102 may compare the current configurations of each of RTAP systems 110 to the corresponding baseline configurations to detect a difference (also referred to as drift) between any of the current configurations and the stored baseline configurations.

In response to detecting a difference between a first configuration (e.g., the current configuration) of RTAP system 110A and a first baseline configuration corresponding to RTAP system 110A, for example, drift detection device 102 may determine whether the difference comprises good drift or bad drift. In some examples, drift detection device 102 may determine whether the difference comprises good drift or bad drift based on the data from data monitoring device 112. For example, drift detection device 102 may analyze log data and/or attack information obtained from data monitoring device 112 via an API and/or test the first configuration via an API to determine whether the difference comprises good drift or bad drift based on the data obtained from data monitoring device 112 via an API (e.g., as described in further detail below). The difference may be classified as bad drift if the first configuration does not include protections against one or more known potential attacks that were included in the first baseline configuration setting. In other words, drift detection device 102 may determine that the difference is bad drift if the first configuration of RTAP system 110A does not include all of the protections of the first baseline configuration for RTAP system 110A. The difference may be classified as good drift if the first configuration includes protections against at least the one or more known potential attacks that were included in the first baseline configuration. In other words, drift detection device 102 may determine that the difference is good drift if the first configuration of RTAP system 110A includes all of (if not more than) the protections of the first baseline configuration for RTAP system 110A. For example, while a given rule from the first baseline configuration setting may be disabled for RTAP system 110A, one or more new rules may have been added to the current configuration of RTAP system 110A to provide adequate coverage as compared to the removed rule. This change would be classified as good drift. Another example of good drift would be if the configuration of RTAP system 110A was updated via an API to remove rules for file transfer but the logs obtained from data monitoring device 112 (e.g., via an API) do not include any indication of successful file transfers. Conversely, bad drift would be identified if the current configuration settings of RTAP system 110A disabled a rule from the first baseline configuration and no replacement rules or comparable protections could be identified in the current configuration settings.

In some examples, drift detection device 102 may conform the current configuration settings for RTAP system 110A to the baseline configuration settings if drift detection device 102 determines that the difference between the current and baseline configuration settings classifies as bad drift. In some examples, drift detection device 102 may generate alert reports in response to determining the difference between the current and baseline configuration settings classifies as bad drift. In some examples, alert reports may include text or graphics in a GUI for presentation on drift detection device 102 and/or other devices. For example, an alert report may include a list of errors indicating missed baseline rules (e.g., an extremely long HTTP request, an illegal byte code character in header name, etc.). In some examples, alert reports may be communicated from drift detection device 102 to other devices in the form of application-based alerts, email messages, text messages, or any other electronic communication. For example, an alert report may be communicated in an email message, such as an emailed document or an emailed link In some examples, the alert reports may be transmitted in XML format.

In some examples, drift detection device 102 may maintain the current configuration settings for RTAP system 110A if drift detection device 102 determines that the difference between the current and baseline configuration settings classifies as good drift. In some examples, drift detection device 102 may replace the baseline configuration settings for RTAP system 110A with the first configuration settings (e.g., if the first configuration includes more protections than the current baseline configuration). In some examples, drift detection device 102 may also alter the configuration settings for RTAP system 110B and/or 110C to conform with the first configuration settings of RTAP system 110A. In this way, RTAP systems 110B and/or 110C may include the additional protections of the first configuration settings.

In some examples, instead of automatically comparing the current configurations of each of RTAP systems 110 to the corresponding baseline configurations, drift detection device 102 may compare one or more configuration parameters of the current configurations of each of RTAP systems 110 to the corresponding one or more configuration parameters of the baseline configurations based on a received user request. The received user request may include a selection of at least one configuration parameter that a user wants to monitor. By comparing only the selected configuration parameters with the corresponding baseline configuration parameters, various aspects of the techniques may enable drift detection device 102 to operate more efficiently (e.g., in terms of processor cycles expended, memory consumed, memory bus bandwidth utilized, etc.) as comparing the all configuration parameters within a current configuration with all configuration parameters within a baseline configuration requires additional resources (e.g., processor cycles, memory space, memory bus bandwidth, etc.).

In some examples, drift detection device 102 may assign a security score indicating the security posture of, e.g., RTAP system 110A at the time of each drift detection. In some examples, the drift detection device 102 may use one or more of historical security score data to generate and provide a historical graph indicating an overall tendency of the security score of RTAP system 110A over a period of time. The historical graph may be viewed with various display methodology such as line, area, bar, point, etc., at user's selection.

As such, the disclosed techniques may improve the security of the RTAP system by being able to detect and classify drift based on real-time application protection system configuration changes. Furthermore, the disclosed techniques may enable a user to check one or more RTAP systems for compliance and alert the user to bad drift.

Figure 2:
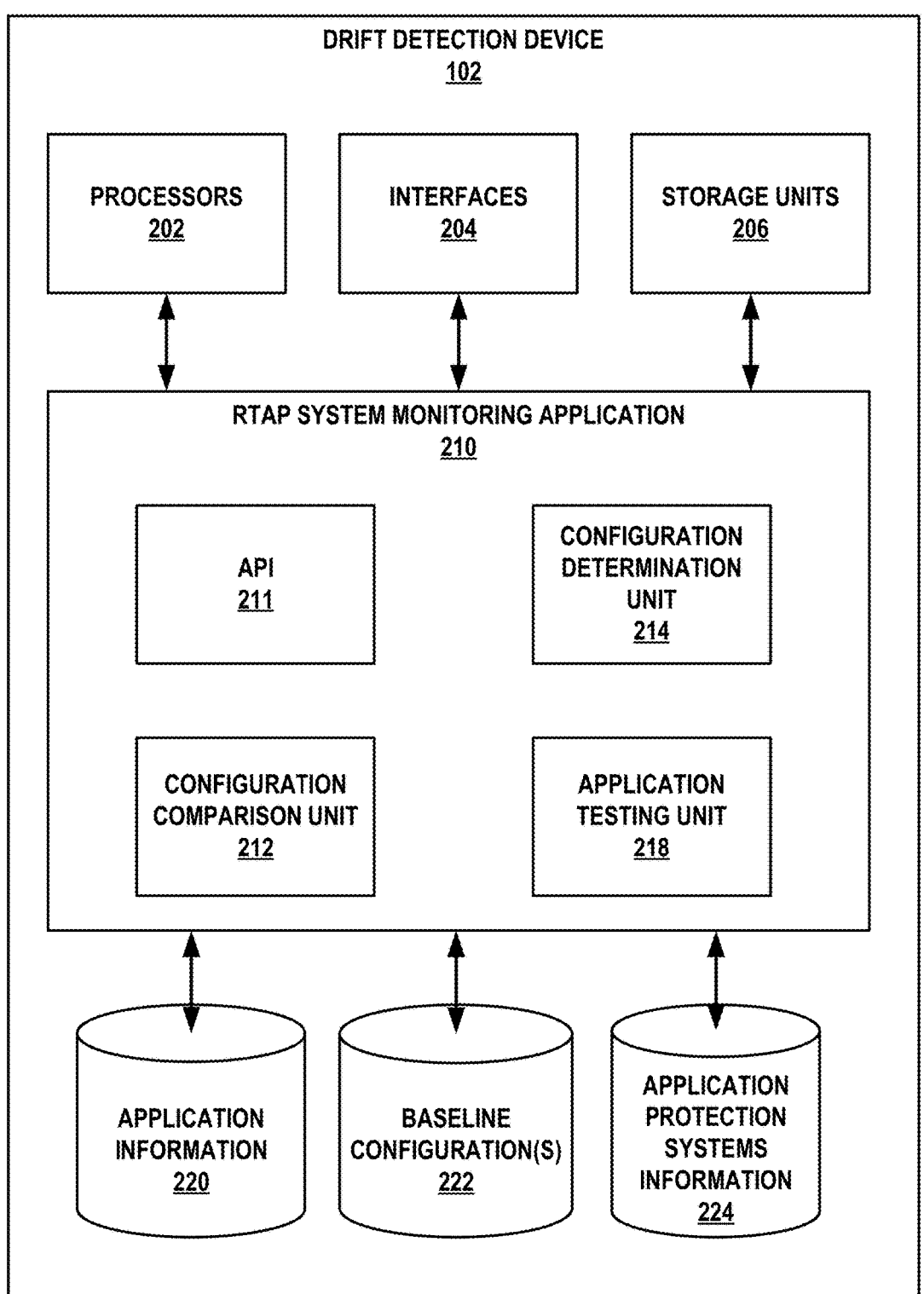
FIG. 2 is a block diagram illustrating an example set of components of a device configured to perform the techniques of this disclosure.

FIG. 2 is a block diagram illustrating an example set of components of drift detection device 102 of FIG. 2, which may be configured to perform the techniques of this disclosure. In the example of FIG. 2, drift detection device 102 includes processors 202, interfaces 204, storage units 206, RTAP system monitoring application 210, application information 220, baseline configurations 222, and RTAP systems information 224. RTAP system monitoring application 210 further includes application programming interface (API) 211, configuration comparison unit 212, and configuration determination unit 214. The components, units or modules of drift detection device 102 are coupled (physically, communicatively, and/or operatively) using communication channels for inter-component communications. In some examples, the communication channels may include a system bus, a network connection, an inter-process communication data structure, or any other method for communicating data.

Processors 202, in one example, may comprise one or more processors that are configured to implement functionality and/or process instructions for execution within drift detection device 102. For example, processors 202 may be capable of processing instructions stored by storage units 206. Processors 202 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Storage units 206 of drift detection device 102 may store an operating system (not shown) executable by processors 202 to control the operation of components of drift detection device 102. Storage units 206 may also be configured to store information within drift detection device 102 during operation. Storage units 206 may include a computer-readable storage medium or computer-readable storage device. In some examples, storage units 206 include one or more of a short-term memory or a long-term memory. Storage units 206 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 206 are used to store program instructions for execution by processors 202. Storage units 206 may be used by software or applications running on drift detection device 102 (e.g., RTAP system monitoring application 210) to temporarily store information during program execution.

Drift detection device 102 may utilize interfaces 204 or API 211 to communicate with other systems or devices via one or more networks, e.g., data monitoring device 112 and/or RTAP systems 110 of FIG. 1. Interfaces 204 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, RTAP system monitoring application 210 utilizes interfaces 204 to wirelessly communicate with data monitoring device 112, RTAP systems 110, applications 104 from FIG. 1.

Application information 220, baseline configurations 222, and RTAP systems information 224 represent one or more respective computer-readable storage media, which may be included within drift detection device 102 as shown in the example of FIG. 2. Alternatively, one or more of application information 220, baseline configurations 222, and RTAP systems information 224 may be stored in one or more remote devices from which drift detection device 102 may request data via interfaces 204 or API 211. The computer-readable storage media may be one or more of a hard disk, a flash drive, random access memory (RAM), or other such computer-readable storage media. Application information 220 may contain information about applications 104 including running status, testing status, and/or identification of individuals responsible for maintaining, updating, and/or testing each of applications 104. Baseline configurations 222 may contain the baseline configuration settings of each of RTAP systems 110. RTAP systems information 224 may include information about RTAP systems 110 including running status information, information about detected attacks, information about the application(s) each RTAP systems 110 is protecting.

In accordance with the techniques of this disclosure, configuration comparison unit 212 of RTAP system monitoring application 210 may compare the current configurations of RTAP systems 110 to the corresponding baseline configurations from baseline configurations 222. In some examples, configuration comparison unit 212 may compare the current configurations of RTAP systems 110 to baseline configurations 222 periodically (e.g., daily, weekly, monthly, quarterly, or any other interval of time). Although illustrated in FIG. 2 as including a single API 211, in other examples, RTAP system monitoring application 210 may include a plurality of APIs to data (including RTAP system configuration information) from one or more remote devices and/or interact with any of the other systems within trusted network 101 of FIG. 1.

In response to detecting a difference between a first configuration (e.g., the current configuration) of a first RTAP system (e.g., RTAP system 110A) and a first baseline configuration corresponding to RTAP system 110A, for example, configuration comparison unit 212 may determine whether the difference is good drift or bad drift. In some examples, configuration comparison unit 212 may analyze log data and/or attack information from data monitoring device 112 of FIG. 1. For example, configuration comparison unit 212 may inspect the log data from data monitoring device 112 to determine whether the first RTAP system detected, blocked, and/or reported known potential attacks (e.g., attacks that would be protected against by the first baseline configuration). If configuration comparison unit 212 determined that a known attack was not detected, blocked, or reported with the first configuration, configuration comparison unit 212 may classify the difference in the configurations as bad drift and update, via an API, the first configuration in line with the first baseline configuration (e.g., to restore protections against known attacks). In some examples, configuration comparison unit 212 would further inspect any detected attack payloads from data monitoring device 112 for further information about the attack. In this way, drift detection device 102 may determine whether the attacks highlight any potential vulnerabilities of any RTAP systems.

In some examples, application testing unit 218 may test the first configuration settings in a test environment to determine whether the difference between the current configuration settings of an RTAP system and the baseline configuration settings corresponding to that RTAP system classifies as good drift or bad drift. For example, application testing unit 218 may simulate the known potential attacks in a test environment (e.g., in an environment that is not accessible publicly over the Internet) to determine whether the current configuration settings of the RTAP systems include protections against known potential attacks (e.g., known potential attacks that would be protected against by the corresponding baseline configuration). Configuration comparison unit 212 would classify the difference as bad drift if any of these tests failed (e.g., if the current configuration of the RTAP system did not include all of the protections of the baseline configuration). The difference may be classified as good drift if the current configuration includes protections against at least the known attacks. In other words, configuration comparison unit 212 may determine that the difference between the current configuration and the baseline configuration is good drift if the current configuration of RTAP system includes all of (if not more than) the protections of the baseline configuration for that RTAP system.

In some examples, configuration determination unit 214 may update (e.g., via an API) the current configuration for the RTAP system to conform to the baseline configuration (e.g., make the current configurations settings the same as the baseline configuration settings) if configuration comparison unit 212 determines that the difference between the current configuration settings and the baseline configuration settings is bad drift. In some examples, configuration determination unit 214 may maintain the current configuration settings for the RTAP system if configuration comparison unit 212 determines that the difference is good drift. In some examples, drift detection device 102 may replace the baseline configuration for RTAP system 110A with the first configuration (e.g., if the first configuration settings include more protections than the current baseline configuration settings). In some examples, drift detection device 102 may also replace the current configuration settings or the baseline configuration settings for RTAP system 110B and/or 110C with the first configuration.

Figure 3:
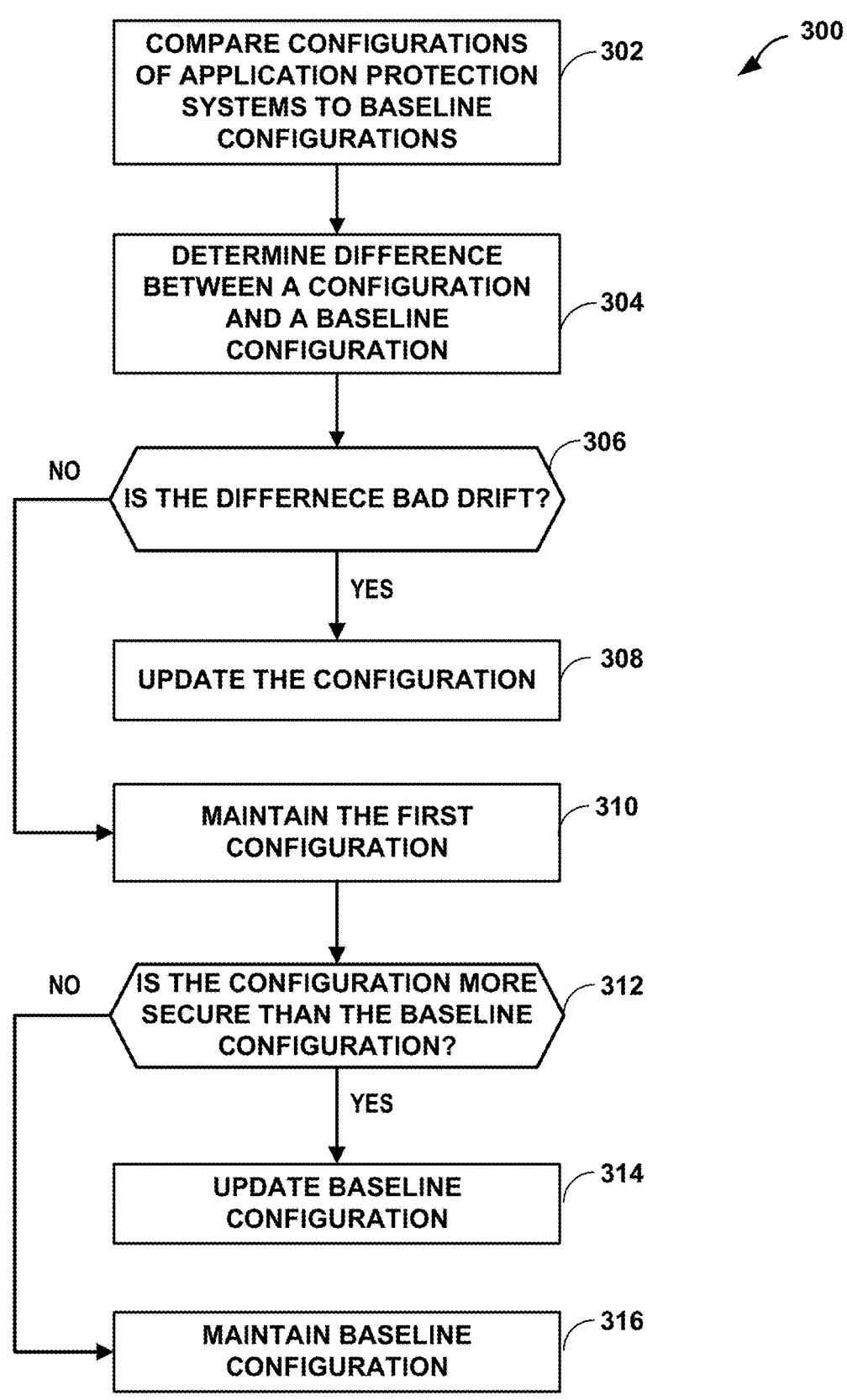
FIG. 3 is a flowchart illustrating an example method of monitoring configurations of real-time application protection systems according to the techniques of this disclosure.

FIG. 3 is a flowchart 300 illustrating an example method of monitoring configurations of RTAP systems according to the techniques of this disclosure. For purposes of example and explanation, the method of FIG. 3 is explained with respect to drift detection device 102 of FIGS. 1 and 2. However, it should be understood that other computer devices may be configured to perform this or a similar method.

Initially, drift detection device 102 compares the configuration settings of RTAP systems to baseline configuration settings (302) and determines a difference between current configuration settings of an RTAP system and baseline configuration settings corresponding to the same RTAP system (304) (e.g., as described above with reference to FIGS. 1-2). In response to detecting the difference between the current configuration settings and the baseline configuration settings of the RTAP system, drift detection device 102 may determine whether the difference comprises good drift or bad drift (306) (e.g., as described above with reference to FIGS. 1-2).

In response to a determination that the difference is bad drift (YES branch of 306), drift detection device 102 may update, via an API, the configuration including the bad drift to conform with the baseline configuration settings (e.g., set the current configuration settings for the RTAP system to be in line with the corresponding baseline configuration settings) (308). In response to determination that the difference is not bad drift (e.g., is good drift) (NO branch of 306), drift detection device 102 may maintain the current configuration of the RTAP system (e.g., not update the current configuration to conform to the baseline configuration). In some examples, drift detection device 102 may determine whether the current configuration is more secure than the corresponding baseline confirmation settings (312). This may be performed as a separate determination by drift detection device 102 in response to an initial determination of good drift or as part of the initial comparison and determination that the difference between the current configuration settings and the baseline configuration settings of the RTAP system is good drift. For example, drift detection device 102 may determine whether the current configuration settings include more protections than the baseline configuration settings (e.g., as described above with reference to FIGS. 1-2). In response to determining that the current configuration settings are more secure than the corresponding baseline configuration settings (YES branch of 312), drift detection device 102 may update (e.g., via an API) the baseline configuration settings to be in line with the current configuration settings (314). For example, drift detection device 102 may replace the baseline configuration for the RTAP system with the current configuration. In response to determining that the current configuration settings are not more secure than the corresponding baseline configuration settings (NO branch of 312), drift detection device 102 may maintain the baseline configuration associated with the RTAP system (e.g., not modify the baseline configuration) (310).

The methods described above with respect to FIG. 3 may be performed by the same device (e.g., drift detection device 102 and/or any other suitable device). Additionally, the components and functionality described above with respect to drift detection device 102 may be performed by a centralized or distributed group of two or more devices.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A computer-implemented method comprising:
detecting a difference between first configuration settings of an application protection system corresponding to a first application and baseline configuration settings of the application protection system, wherein the baseline configuration settings include protections against a first plurality of attacks;
in response to detecting the difference:
analyzing one or more logs corresponding to the first application to determine whether the first configuration settings protect against at least the first plurality of attacks, and
determining whether the difference comprises good drift or bad drift, wherein the difference comprises good drift if the one or more logs include indications that known potential attacks included in at least the first plurality of attacks are detected, blocked, or reported by the application protection system corresponding to the first application and wherein the difference comprises bad drift if the one or more logs include indications that the known potential attacks included in at least the first plurality of attacks failed to be detected, blocked, or reported by the application protection system corresponding to the first application; and
in accordance with a determination that the difference comprises good drift, maintaining the first configuration settings for the application protection system.

2. The method of claim 1, further comprising, in accordance with the determination that the difference comprises good drift, updating the baseline configuration settings to the first configuration settings, wherein the first configuration settings include protections against an additional attack that is not included in the baseline configuration settings.

3. The method of claim 1, further comprising, in accordance with the determination that the difference comprises good drift, updating second configuration settings of a second application protection system corresponding to a second application within a same network as the first application to be substantially similar to the first configuration settings.

4. The method of claim 1, wherein the first configuration settings disable a first rule corresponding to a respective attack, and wherein analyzing the one or more logs comprises analyzing the one or more logs corresponding to the first application to determine whether the first configuration settings include one or more second rules that provide protection against at least the respective attack.

5. The method of claim 1, wherein the first configuration settings disable a first rule corresponding to a respective attack, and wherein analyzing the one or more logs further comprises:

identifying an attack payload corresponding to the respective attack in the one or more logs corresponding to the first application, wherein the application protection system blocked the respective attack for the first application when the application protection system had the baseline configuration settings; and determining whether the application protection system is configured to block the respective attack when the application protection system has the first configuration settings.

6. The method of claim 1, further comprising:

detecting a second difference between second configuration settings of a second application protection system corresponding to a second application and second baseline configuration settings of the second application protection system, wherein the second baseline configuration settings include protections against the first plurality of attacks;

in response to detecting the second difference:

analyzing the one or more logs corresponding to the second application to determine whether the second configuration settings protect against at least the first plurality of attacks, and determining whether the second difference comprises good drift or bad drift; and in accordance with a determination that the second difference comprises bad drift, setting the second application protection system to have the second baseline configuration settings.

7. The method of claim 6, further comprising, in accordance with the determination that the second difference comprises bad drift, generating an alert indicating that bad drift has been detected.

8. The method of claim 1, wherein determining whether the difference comprises good drift or bad drift further comprises:

simulating the first plurality of attacks on the first application in a test environment; and determining, based on the simulation, whether the first configuration settings include protections against at least the first plurality of attacks.

9. The method of claim 8, wherein determining whether the first configuration settings include protections against at least the first plurality of attacks includes comparing a first plurality of attack signatures associated with the first plurality of attacks to the first configuration settings.

10. A device comprising:

a memory; and one or more processors implemented in circuitry and in communication with the memory, the one or more processors configured to:

detect a difference between first configuration settings of an application protection system corresponding to a first application and baseline configuration settings of the application protection system, wherein the baseline configuration settings include protections against a first plurality of attacks;

in response to detecting the difference:

analyze one or more logs corresponding to the first application to determine whether the first configuration settings protect against at least the first plurality of attacks, and determine whether the difference comprises good drift or bad drift, wherein the difference comprises good drift if the one or more logs include indications that known potential attacks included in at least the first plurality of attacks are detected, blocked, or reported by the application protection system corresponding to the first application and wherein the difference comprises bad drift if the one or more logs include indications that the known potential attacks included in at least the first plurality of attacks failed to be detected, blocked, or reported by the application protection system corresponding to the first application; and in accordance with a determination that the difference comprises good drift, maintain the first configuration settings for the application protection system.

11. The device of claim 10, wherein the one or more processors are further configured to, in accordance with the determination that the difference comprises good drift, update the baseline configuration settings to the first configuration settings, wherein the first configuration settings include protections against an additional attack that is not included in the baseline configuration settings.

12. The device of claim 10, where the one or more processors are further configured to, in accordance with the determination that the difference comprises good drift, update second configuration settings of a second application protection system corresponding to a second application within a same network as the first application to be substantially similar to the first configuration settings.

13. The device of claim 10, wherein the first configuration settings disable a first rule corresponding to a respective attack, and wherein to analyze the one or more logs, the one or more processors are further configured to analyze the one or more logs corresponding to the first application to determine whether the first configuration settings include one or more second rules that provide protection against at least the respective attack.

14. The device of claim 10, wherein the first configuration settings disable a first rule corresponding to a respective attack, and wherein to analyze the one or more logs, the one or more processors are further configured to:

identify an attack payload corresponding to the respective attack in the one or more logs corresponding to the first application, wherein the application protection system blocked the respective attack for the first application when the application protection system had the baseline configuration settings; and determine whether the application protection system is configured to block the respective attack when the application protection system has the first configuration settings.

15. The device of claim 10, wherein the one or more processors are further configured to:

detect a second difference between second configuration settings of a second application protection system corresponding to a second application and second baseline configuration settings of the second application protection system, wherein the second baseline configuration settings include protections against the first plurality of attacks;

in response to detect the second difference:

analyze the one or more logs corresponding to the second application to determine whether the second configuration settings protect against at least the first plurality of attacks, and determine whether the second difference comprises good drift or bad drift; and in accordance with a determination that the second difference comprises bad drift, set the second application protection system to have the second baseline configuration settings.

16. The device of claim 15, wherein the one or more processors are further configured to:

in accordance with the determination that the second difference comprises bad drift, generate an alert indicating that bad drift has been detected.

17. The device of claim 10, wherein to determine whether the difference comprises good drift or bad drift, the one or more processors are further configured to;

simulate the first plurality of attacks on the first application in a test environment; and determine, based on the simulation, whether the first configuration settings include protections against at least the first plurality of attacks.

18. The device of claim 17, wherein to determine whether the first configuration settings include protections against at least the first plurality of attacks, the one or more processors are configured to compare a first plurality of attack signatures associated with the first plurality of attacks to the first configuration settings.

19. Non-transitory computer-readable media storing instructions that, when executed by a computing system, cause one or more processors of the computing system to:

detect a difference between first configuration settings of an application protection system corresponding to a first application and baseline configuration settings of the application protection system, wherein the baseline configuration settings include protections against a first plurality of attacks;

in response to detecting the difference:

analyze one or more logs corresponding to the first application to determine whether the first configuration settings protect against at least the first plurality of attacks, and determine whether the difference comprises good drift or bad drift, wherein the difference comprises good drift if the one or more logs include indications that known potential attacks included in at least the first plurality of attacks are detected, blocked, or reported by the application protection system corresponding to the first application and wherein the difference comprises bad drift if the one or more logs include indications that the known potential attacks included in at least the first plurality of attacks failed to be detected, blocked, or reported by the application protection system corresponding to the first application; and in accordance with a determination that the difference comprises good drift, maintain the first configuration settings for the application protection system.

20. The non-transitory computer-readable media of claim 19, wherein the instructions further cause the one or more processors to, in accordance with the determination that the difference comprises good drift, update the baseline configuration settings to the first configuration settings, wherein the first configuration settings include protections against an additional attack that is not included in the baseline configuration settings.

* * * * *